Jan. 31, 1967  W. E. LOWREY  3,301,523
RESILIENT VALVE SEATS WITH RETENTION MEANS
Filed April 17, 1964  4 Sheets-Sheet 1

INVENTOR.
WILLIAM E. LOWREY
BY
AGENT

INVENTOR.
WILLIAM E. LOWREY
BY
AGENT

INVENTOR.
WILLIAM E. LOWREY
BY
AGENT

United States Patent Office 3,301,523
Patented Jan. 31, 1967

3,301,523
RESILIENT VALVE SEATS WITH
RENTENION MEANS
William E. Lowrey, Houston, Tex., assignor to ACF Industries, Incorporated, New York, N.Y., a corporation of New Jersey
Filed Apr. 17, 1964, Ser. No. 360,517
6 Claims. (Cl. 251—172)

The invention is directed to valves in general and more specifically to valves which utilize sealing elements composed of elastomeric material and which are designed for both low and high pressure application. Such valves are generally designed with the specific ladings and working pressure ranges as prime design considerations. If the valve is to be used in low pressure applications, for example 100 p.s.i. or lower, depending upon the valve size, a sealing ring for the valve may be composed of an elastomer material such as rubber or one of the numerous well-known rubber-like synthetic elastomeric materials commercially available for use as a sealing material. Rubber or rubberlike materials are desirable in most non-corrosive valve applications because they are inexpensive to obtain and because they have an inherent ability to conform under pressure to most surfaces to produce an effective seal even though the surfaces may not be exceptionally smooth. When utilizing rubber or rubberlike materials for seat elements in valves, therefore, the machining costs of the metal valve parts may be kept at a minimum.

As the pressure range of valve operation increases to intermediate and high pressure ranges, however, seat elements composed of elastomeric materials become less desirable because the material may be excessively deformed by the severe loads to which the valve elements are subjected by the lading. Excessive deformation of the seat elements results in an increase in the area of surface contact between the seat and the valve element, thus resulting in a high torque required to impart movement to the gate or plug from one position to another. Excessive seat deformation at high line pressures also allows excessive downstream travel of the valve element which imparts severe side thrust loads to the operating stem producing excessive stem packing wear as well as reducing the ability of the valve seat element to achieve an upstream seal as well as a downstream seal. Elastomer sealing elements are generally undesirable at high line pressure conditions because they are easily extruded into a position where they may be engaged and severed by the valve member as it is moved.

Plastic materials have recently been developed by the chemical industry, for use as valve sealing elements. Among these plastic materials are polytetrafluoroethylene, sold under the registered trademark "Teflon" by the E. I. du Pont de Nemours & Company and a fully saturated fluorocarbon copolymer of chlorotrifluoroethylene and vinylidine fluoride, sold under the registered trademark "Kel-F" by the M. W. Kellogg Company. These new plastic materials have been enthusiastically received in the industry because they are especially suited for a great variety of uses, for which other known sealing materials are not adapted. A number of disadvantages exist, however, which limit the use of these exotic sealing materials in valves. While these new plastic materials are quite satisfactory for intermediate and high pressure ranges they are not generally satisfactory under low pressure conditions because of their inability to conform under low line pressure to the valve surfaces. The machining operations for producing the sealing surfaces of the valve must be held to unusually close tolerances thus increasing the cost of the valve. The extremely high initial cost of these plastic materials themselves also is a disadvantage in that they tend to reduce the the competitiveness of the valve. The plastic sealing materials are generally considered undesirable for combined low and high pressure or "full range" pressure application because they do not readily conform to the sealing surface at low pressure conditions due to their nonresilience and if deformed at high line pressures, the plastic material at times will be permanently distorted and will not return to its original shape thus making a low pressure seal highly improbable.

A valve which will produce an effective seat at both high and low line pressures and which employs economical elastomeric sealing materials has many advantages.

A minimum of inventory would be needed for efficient operation. A single "full range" valve could be stocked for use in emergencies regardless of the pressure to which it is to be subjected. Low initial purchase costs and subsequent low repair costs of a "full range" valve employing low cost elastomeric sealing members would tend to increase the competitiveness of the particular valve.

Accordingly it is a primary object of this invention to provide a novel valve which lends itself to positive sealing at both low and high line pressures.

It is a further object of this invention to provide a novel valve having seat members which are activated by the lading under line pressure to provide an upstream seal.

It is among the objects of this invention to provide a novel valve construction which will provide a proper seal regardless of the direction of line flow.

A further object of this invention contemplates the provision of novel valve member employing high pressure resilient sealing members which will not be torn or otherwise displaced by the lading during movement of the valve member.

Other and further objects of this invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purpose of illustration and description and is shown in the accompanying drawings, forming a part of the specification wherein.

Briefly, the invention is directed to seat assemblies for a valve which include resilient sealing members which are positively locked within the respective seat assembly and which will form an upstream seal regardless of the direction of fluid flow or the magnitude of the operating pressure.

Figure 1:
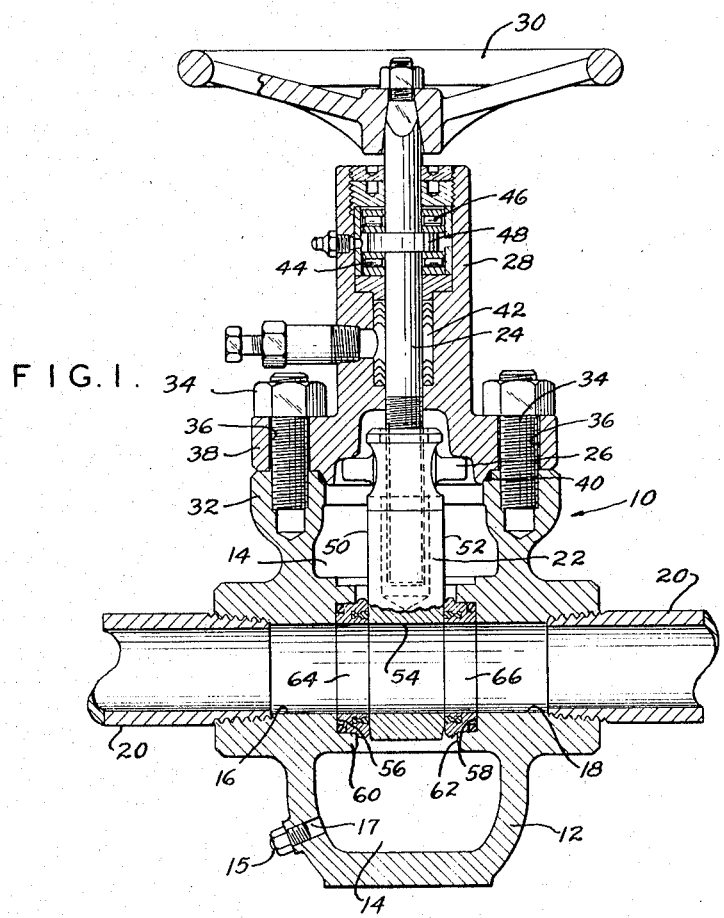
FIGURE 1 is an elevational view in section illustrating the invention.

Referring now the drawings for a better understanding of the invention, a valve 10 is illustrated in FIGURE 1 which comprises a valve body 12 formed with a valve chamber 14 and having flow passages 16 and 18 in communication with the valve chamber 14. The flow passages may be internally threaded as illustrated for threadedly connecting the valve 10 into an externally threaded pipeline 20 or the valve body may be connected to a pipe system by other well-known connection structure such as bolted flange connection or welded connection for example, without departing from the spirit or the scope of this invention. A gate member 22 is positioned within the valve chamber 14 and is movable between open and closed positions relative to the flow passages 16 and 18. A stem having external threads thereon is threadedly received at one end thereof by an internally threaded drive nut 26 which is retained at one end of the gate 22 whereby rotary movement of the stem 24 imparts reciprocation to the gate 22. The stem 24 extends through a bonnet assembly 28. A valve operating means such as the handwheel 30 is nonrotatably fixed to the other end of the stem for manual rotation thereof to effect reciprocation of the gate member 22. The specific gate operator structure illustrated in FIGURE 1 and described herein is intended as merely illustrative rather than limiting with respect to this invention. Various well-known electric, mechanical or hydraulic systems for effecting gate reciprocation may be employed with this invention without departing from the spirit or the scope thereof.

The bonnet assembly 28 is removably fixed to an annular flange portion 32 of the valve body 12 by a series of studs 34 which extend through a series of openings 36 formed in an annular bonnet flange 38 to form a closure for the valve chamber 14. An annular sealing member 40 is disposed between the bonnet and the valve body to establish a fluid-tight seal.

A stem packing assembly 42 is positioned within the bonnet 28 and about the stem 24 to establish a seal between the stem and bonnet to prevent leakage of lading from the valve chamber 14 along the stem 24. A lower thrust bearing 44 and an upper thrust bearing 46 are positioned on opposite sides of an enlarged flange 48 formed integral with the stem 24 to prevent vertical stem movement during opening or closing of the valve.

The gate member 22 is of the flat or slab type having parallel planar working surfaces 50 and 52 formed thereone for blocking the flow passages 16 and 18 respectively. A port 54 formed in the gate 22 is adapted, in the open position of the gate, to register with the flow passages 16 and 18 to allow fluid to flow through the valve 10.

A pair of opposing seat recesses 56 and 58 are formed respectively in annular opposing bosses 60 and 62 which are formed concentrically with the associated flow passage and which extend into the valve chamber 14.

In accordance with a feature of this invention, a pair of identical opposed valve seat assemblies 64 and 66 are loosely positioned within the respective seat recess. As illustrated in detail in FIGURE 2, each of the seat assemblies consists of a relatively rigid annular seat ring 68 having an enlarged diameter interior surface defining an interior annular retainer flange 70. The flange 70 is formed with a generally conical surface 72 facing toward the gate member 22 and an annular planar surface 74 facing away from the gate 22 and being disposed generally in parallel relation with the working surfaces 50 and 52 of the gate. An annular shoulder 76 and an annular rim 78 are formed on each of the seat rings 68 and coact with the walls of the respective seat recess to define an annular chamber 80 for retaining an annular O-ring type resilient sealing member 82. The cross sectional diameter of the O-ring 82 is greater than the axial dimension of the rim 78 and greater than the radial dimension of the shoulder 76 whereby the sealing ring 82 will extend axially and radially beyond the seat ring and into intimate sealing contact with the radial wall 84 and the axial wall 86 of the seat recess. An annular planar sealing surface 88 is formed on each of the seat rings 68 parallel with the associated working surface of the gate 22.

An annular retainer ring 90 is positioned within the seat ring 68 and has a surface 92 thereof in abutment with the shoulder 77 of the seat ring. An annular external flange 94 is formed intermediate the length of the retainer 90 and has a generally conical wall 96 directed toward the gate 22. An annular planar support shoulder 98 of the flange 94 is disposed in substantially coplanar relation with the support shoulder 74 on the seat ring 68. An annular sealing surface 100 is formed on the retainer ring 90 in generally coplanar relation with the sealing surface 88 on the seat ring 68.

The seat ring 68 and the retainer ring 90, when in assembly, define an annular groove 102 for receiving an annular sealing ring 104. When the seat and retainer rings are in assembly the annular flanges 70 and 94 oppose each other to define a restriction in the groove 102. The sealing ring, which is preferably formed of a resilient material such as rubber or of one of numerous well-known synthetic rubberlike materials commercially available for use as sealing rings, is formed with an annular sealing portion 106 having a rounded outer surface 108 which has intimate contact with the associated working surface 50-52 of the gate 22. The sealing portion 106 of the sealing ring 104 is of smaller cross sectional dimension than the cross sectional dimension of the outer portion of the groove 102 and extends axially beyond the plane of the sealing surfaces 88 and 100 whereby the sealing portion 106 of the sealing ring 104 will be displaced entirely within the groove when the sealing surfaces 88 and 100 engage the working surfaces of the gate, as will occur when the valve is closed under high line pressure conditions. An annular base portion 110 of the sealing ring 104, having a generally rectangular cross section is disposed at the inner end of the groove 102 and is in intimate contact with the support surface 75 on the seat ring 68. The base portion 110 is slightly smaller in cross section than the inner portion 112 of the groove 102 allowing lateral movement of the sealing ring 104 within the groove 102. The sealing portion 106 and the base portion 110 of the sealing ring 104 are connected by an integral web portion 114 which substantially fills the constriction defined by the opposed flanges 70 and 94.

Figure 2:
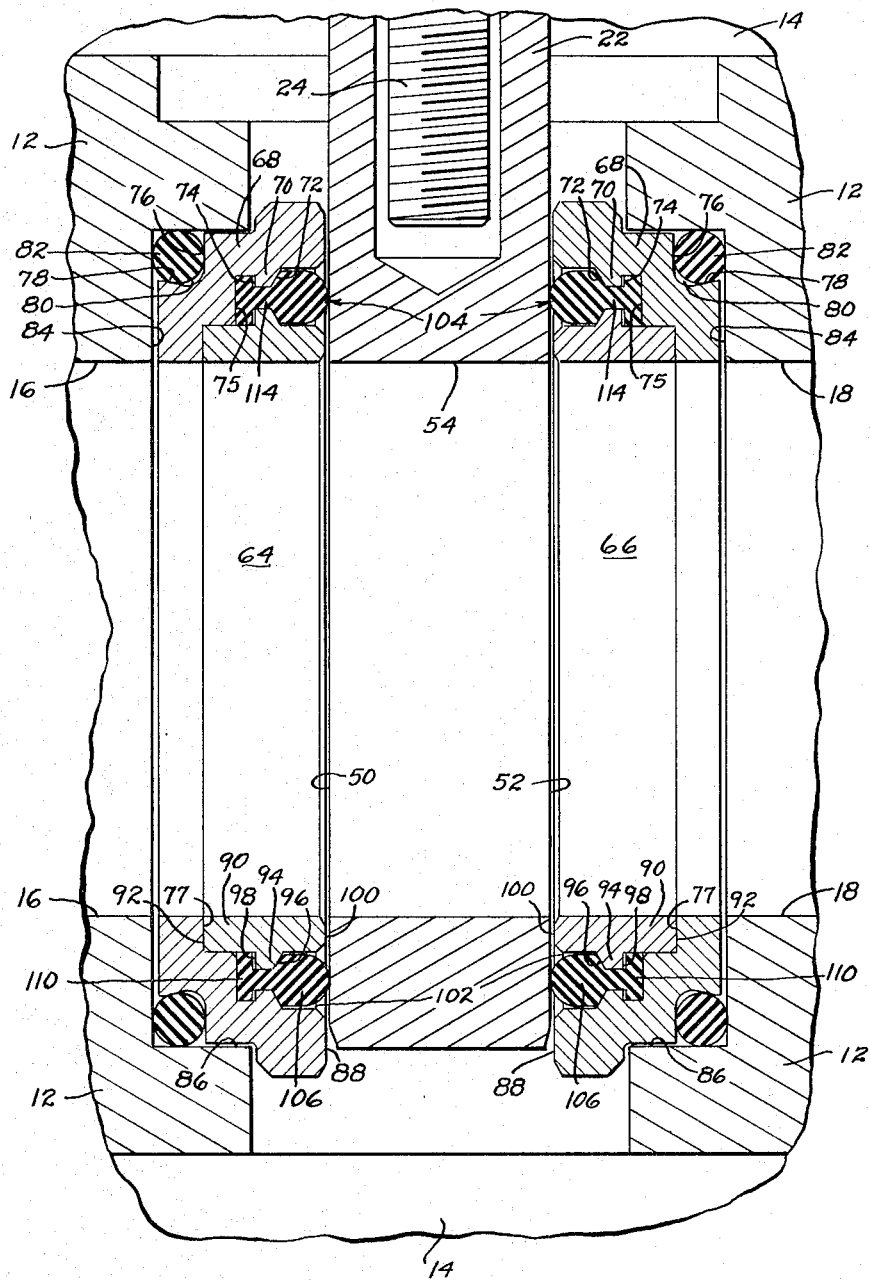
FIGURES 2–6 are partial sectional views illustrating operation of the seat members of the valve of FIGURE 1.

When the valve 10 is not under pressure as illustrated in FIGURE 2, or when the pressure within the valve chamber 14 and the pressure within the flow passages 16-18 is equal, with the gate 22 in its open position, the upstream seat assembly and the downstream seat assembly will be in a balanced condition. The sealing surfaces 88 and 100 will be spaced from the working surfaces 50-52 of the gate and the rounded outer surface 108 of the sealing ring 104 will be in intimate contact with its associated working surface 50-52. The seat ring 68 will be in spaced relation with the support surface 84 and the back face sealing ring 82 will be in light sealing engagement with the radial wall 84 and the axial wall 86, which define the seat recess 58, and with the rim 78 and the shoulder 76 of the seat ring 68 to establish a fluid-tight seal between the seat assembly and the valve body.

Figure 3:
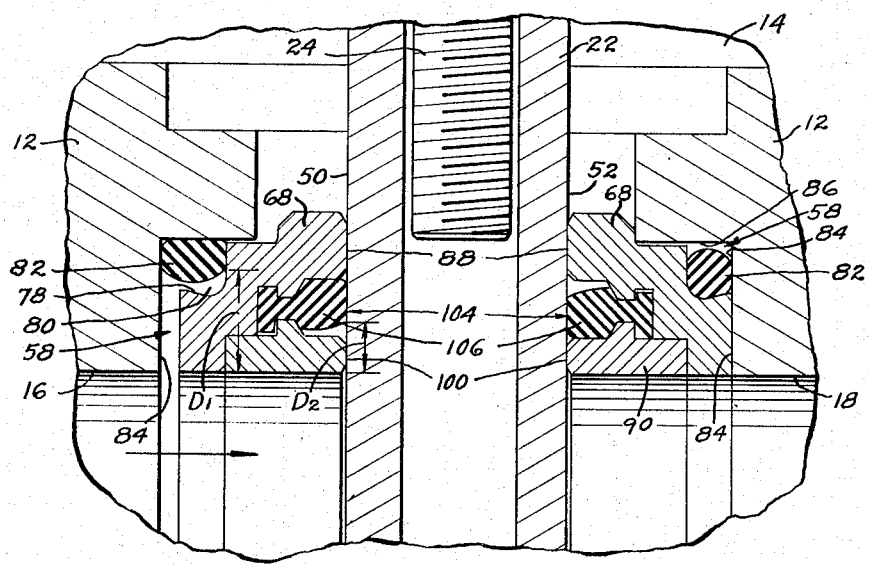

Assuming that the gate 22 of the valve 10 is in its closed position blocking the flow of lading through the flow passages 16 and 18, as illustrated in FIGURE 3, the pressurized lading will enter the space between the surface 84 of the recess and the back face of the upstream seat assembly 64 (left). Since the area of the back face of the seat assembly to which the pressurized lading is exposed (the annular area defined by the radial distance between the bore and the sealing contact between the O-ring 82 and the shoulder 76 and represented by D1) is larger than the exposed face area of the seat assembly (represented by D2), the force applied by the lading will be greater at the back face portion than at the face portion of the seat assembly, thus causing the seat assembly to be moved into contact with the gate member 22. The force which is applied to the gate 22 by the pressurized lading is generally quite substantial and forces the downstream seat assembly (right) in a downstream direction until the planar surface 85 of the seat ring 68 engages the radial surface 84 of the seat recess 58. Therefore, in the closed position of the gate 22 the upstream seat assembly and the downstream seat assembly will be in intimate sealing contact with the respective working surface of the gate and will also be in sealing engagement with the valve body. While the valve is operating under high line pressure conditions, the planar sealing surfaces 88 and 100 on the seat ring 68 and the retainer ring 90, respectively, will be in intimate sealing contact with the gate because the sealing ring will be unable to absorb the entire gate load and will be completely deformed into the groove 102. With the valve operating under low line pressure the force applied to the downstream seat assembly by the gate will be absorbed entirely by the sealing ring 106. The sealing ring will be distorted only to the extent that it conforms to the respective working surface of the gate 22 to establish a fluid-tight seal and the annular planar surfaces 88 and 100 will be spaced from the working surfaces of the gate. When the line pressure is higher than the valve chamber pressure, the O-ring type back face sealing member 82 of the upstream seat assembly (left) will be forced by the pressurized lading, entering between the radial surface 84 of the seat recess and the seat ring 68, in a radially outwardly direction such that it breaks sealing engagement with the rim 76 but achieves a tight seal between the radial wall 84 and the axial wall 86 of the seat recess and the shoulder 76 of the seat ring 68. As the pressure within the line increases from the low pressure range to the high pressure range, fluid under increasing line pressure will flow through the space between the surface 100 and the gate and engage the sealing member 104 causing the face sealing portion 106 thereof to be moved radially outwardly into sealing engagement with the outer wall of the groove 102 and with the working surface 50 of the gate 22. As the line pressure builds to the high pressure range and the surface 100 of the retainer ring and the surface 50 of the gate come into intimate sealing contact, there will be minute leakage between these metal surfaces because the finish on the surfaces is not sufficiently smooth to achieve a bubble-tight seal. This minute leakage in time will transmit the full line pressure to the sealing portion 106 of the sealing ring 104 thereby causing it to be maintained in a radially expanded condition. The pressurized lading in the valve body, tending to flow past the downstream seat assembly, will force the face sealing portion 106 of the sealing ring 104 and the O-ring back sealing member to be contracted radially inwardly. The minute leakage between the annular surface 88 of the downstream seat ring 68 (right) and the working surface 52 of the gate 22 will maintain the face sealing portion 106 in sealing engagement with the inner circumferential wall of the groove 102 and with the working surface 52 of the gate. Lading under body pressure tending to flow between the seat ring 68 and the wall 84 of the seat recess will force the O-ring back sealing member 82 to contract radially inwardly thereby breaking its sealing contact with the axial wall 86 of the associated seat recess but maintaining a fluid-tight seal between the seat ring 68 and the radial wall 84 of the downstream seat recess to prevent the escape of pressurized lading from the valve chamber 14 into the downstream flow passage 18.

Assuming that the direction of fluid flow in the line 20 should be reversed with the gate closed, as illustrated in FIGURE 3, the seat assembly (right) would then become the upstream seat and the (left) seat assembly would be moved by the gate 22 into a downstream sealing position. The back face sealing rings 82 and the face sealing rings 104 would be forced by the lading to reverse their positions. A valve in accordance with this invention, therefore, will readily seal both upstream and downstream regardless of the direction of flow in the line 20. An effective seal will be established at both low and high pressure ranges without causing excessive distortion of the elastomeric sealing rings thus resulting in minimum gate movement. As the line pressure increases to a level above the low pressure range, the metallic seat rings and the retainer rings will effectively carry the gate load, thus preventing overcompression of the sealing rings 104 or the back face sealing rings 82.

Figure 4:
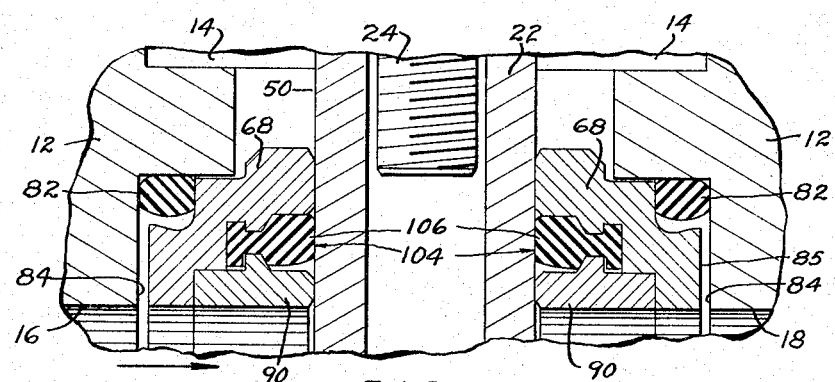

As illustrated in FIGURE 4, the valve chamber 14 may be bled by opening a bleed fitting 15 (FIGURE 1), which is fitted into a bore 17 formed in the valve body 12. Valve chamber bleeding is performed as a test to determine whether lading is leaking past either of the seat members 64. The gate 22 may be in either the open or closed position with the valve chamber bled to atmospheric pressure but the gate must not be moved from one position to the other with the bleed fitting open because communication between the flow passages 16–18 and the valve chamber 14 will occur as the gate is reciprocated. With the valve in its open condition, as illustrated in FIGURE 4, each of the seat assemblies will function essentially as if it were an upstream seat as described above in regard to FIGURE 3. Both the upstream seat assembly and the downstream seat assembly will be actuated by the pressurized lading in the flow passage and will move tight sealing contact with the gate member 22. Both the sealing ring 104 and the back face sealing ring 82 of each seat assembly 64 will move radially outwardly and will establish fluid-tight seals preventing any lading from flowing between the gate and the seat assembly or between the body and the seat assembly and into the depressurized valve chamber. If the flow of fluid from the valve chamber does not stop in a short while, after the drain fitting 15 has been opened, the operator can be assured that at least one of the seat assemblies is leaking and the valve must be repaired.

Figure 5:
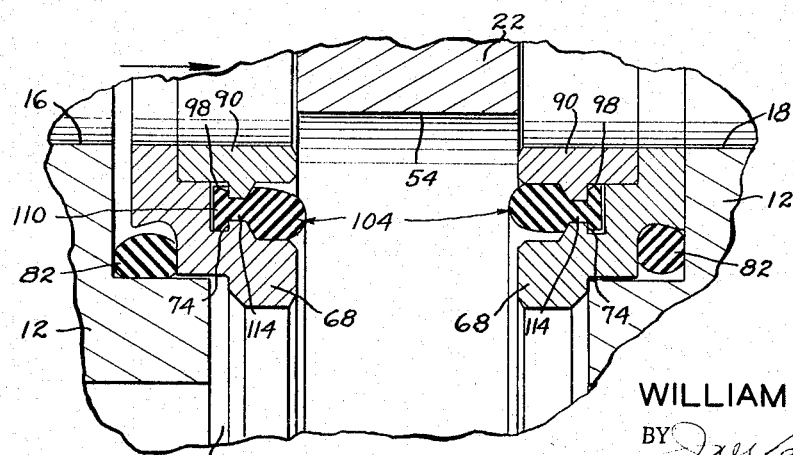

As illustrated in FIGURE 5, the most critical periods of valve seat operation are the periods during which the gate or valve member is being moved from its closed position to its open position. After the lower portion of the port 54 in the gate 22 enters the flow passage, fluid under line pressure begins to surge through the port 54 and into the downstream line. This surge of pressurized fluid causes extreme turbulence in the area of the seat assemblies which tends to suck or extrude the sealing rings toward the flow passage. In high pressure valve applications an O-ring type elastomer face sealing ring will easily be sucked or blown out of its seat and carried downstream by the pressurized lading or it may be extruded into a position where it is engaged and sheared or damaged by the gate as the upper portion of the port 54 is moved past the seat ring. The turbulence under extreme pressures is so severe when ladings such as natural gas are controlled, for example, that even steel sealing rings may be blown from the seat recess and carried downstream with the lading. The base portions 110 of each of the sealing rings 104 engage the support shoulders 74 and 98 to solidly anchor the sealing ring within the groove thus preventing excessive axial movement of the sealing ring 104. The sealing ring, since it is firmly anchored within the groove, will not be blown from the groove nor damaged by the gate during opening or closing of the valve.

Figure 6:
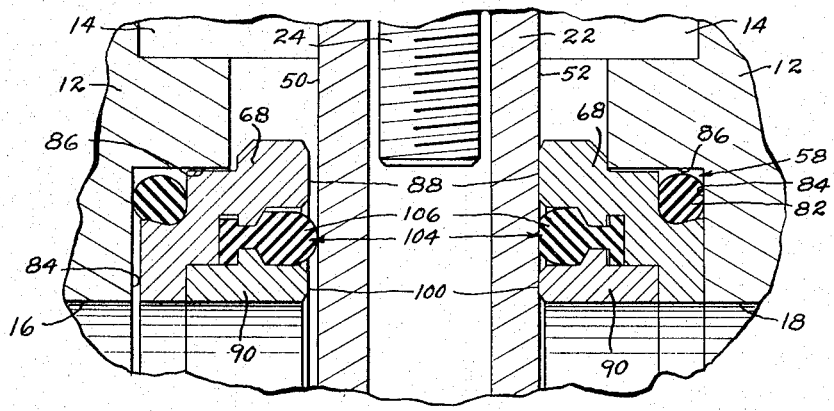

The seat assemblies of the invention will also allow the venting of excessive valve chamber pressure into the upstream line and thus will prevent damage to or destruction of the valve. As illustrated in FIGURE 6, the gate 22 is in its closed position and the pressure within the valve chamber 14 exceeds the line pressure. The upstream seat assembly will be moved or pressure actuated in the upstream direction by the valve chamber pressure thus breaking the seal between the upstream seat assembly and the gate and allowing the excessive pressure to be bled between the seat and gate into the upstream line. This is a safety feature incorporated into the invention to prevent damage to the valve mechanism or even rupture of the valve body due to excessive valve chamber pressure. Valve chamber pressure may be caused by expansion of liquid trapped within the valve chamber when the liquid becomes heated by high ambient temperatures or from heat caused by a fire, etc., and especially when volatile ladings such as butane, propane, or even more exotic petroleum or chemical ladings are handled under high ambient temperatures. If the excessive valve chamber pressure is not relieved, it is possible that the pressure could build very rapidly to a high enough level to rupture the valve. In the present invention, when the valve chamber pressure is below line pressure, the seat arrangement will be as shown and described above in regard to FIGURE 3. As the valve chamber pressure builds to a level equal to line pressure, the upstream seat will become balanced and will relax because the forces acting on the face area and back face area of the seat assemblies will be balanced due to equal pressure on each side of the upstream sealing member. As pressure in the valve chamber increases to a level above line pressure, due to high ambient temperatures as described above (FIGURE 6), the force applied to the face surface of the upstream seat assembly by the fluid under excessive valve chamber pressure will be greater than the force applied to the back face area of the seat assembly by the pressurized lading and the upstream (left) seat assembly will be moved in an upstream direction (left). Upstream movement of the upstream seat assembly will cause the face seal to be broken and will, therefore, allow the excessive pressure within the valve body to escape between the gate and the seat assembly into the upstream line. Since the chamber pressure will be bled into the upstream line upon becoming excessive, the maximum valve chamber pressure which will be allowed to exist will be only slightly above line pressure.

Figure 7:
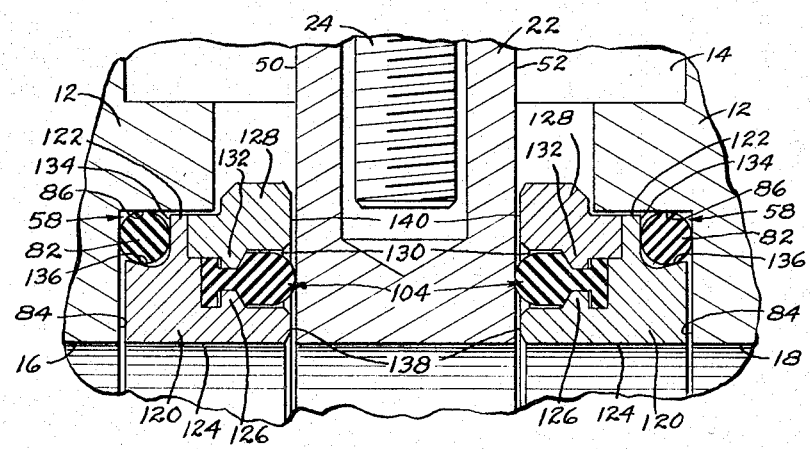

In accordance with another feature of this invention, as illustrated in FIGURE 7, a modified seat assembly embodying the invention utilizes an outer removable retainer ring to retain a sealing ring identical to the sealing ring illustrated in FIGURES 1 and 2. This seat assembly is so constructed that it is interchangeable with the seat assembly 64 illustrated in FIGURE 1. The seat ring 120 is formed with an outer circumferential surface 122 having a slightly smaller diameter than the outer diameter of the seat recess 58 and an inside diameter 124 of the same dimension as the flow passage diameter, whereby the seat members form a portion of the flow path of the valve. A reduced diameter portion of the seat ring 120 is formed with an exterior flange 126. An outer removable retainer ring 128 loosely fitting the seat ring 120 to define an annular groove 130, is formed with an interior flange 132 which cooperates with the flange 126 to define an intermediate annular restriction in the groove 130. The groove 130 is of substantial identical cross sectional shape and dimension as the groove 102 (FIGURE 2) and retains the annular sealing ring 104 in the same manner and for the same purpose as described hereinabove in regard to FIGURES 1-2. An annular shoulder 134 and an annular rim 136 are turned into the outer portion of the seat ring 120 and define, with the walls of the seat recess 58, an annular chamber for retaining the O-ring type resilient back face sealing ring 82. The back face sealing ring 82 is dimensioned, relative to the dimensions of the shoulder 134 and rim 136 so that it extends axially and radially beyond the seat ring 120 and sealingly engages the radial wall 84 and the axial wall 86 of the seat recess 58 in the same manner discussed above in regard to FIGURES 1-2. Substantially coplanar annular sealing surfaces 138 and 140 are formed respectively on the seat ring 120 and the retainer ring 128 and are engaged by the working surfaces 50-52 of the gate 22 to form a metal to metal fluid-tight seal when the valve 10 is controlling lading at high pressure conditions.

Figure 8:
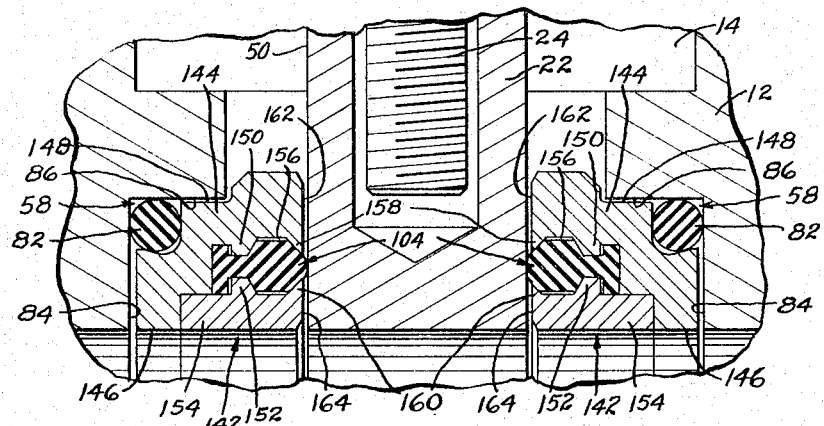

In accordance with another feature of this invention, as illustrated in FIGURE 8, seat assemblies 142 may be provided which include an inner retainer ring 154 and an outer seat ring 144, each of which is provided with an annular lip and which cooperates in assembly to define an outer restriction for a sealing ring retainer groove. The outer restriction prevents the extrusion of the resilient sealing ring into the path of the gate, at extremely high line pressures, where it may be engaged and severed or damaged by the gate upon opening or closing thereof. Annual identical seat assemblies 142, fitting within the seat recesses 56 and 58 of the valve 10, are each composed of an annular seat ring 144 formed to receive a back face sealing ring in the manner and for the purpose described above. The seat ring 144 has an inner dimension 146 substantially the same as the dimension of the flow passages 16 and 18 and an outer cylindrical surface 148 loosely fitting within the axial wall 86 of the seat recess 58. The seat ring 144 has an interior flange 150 defined thereon which cooperates with an interior flange 158, formed integrally with an annular retainer ring 154 fitted to the seat ring 144 and retains the annular sealing ring 104 within a sealing ring groove 156 as described above. An inwardly facing retainer lip 158 is formed integral with the seat ring 144 which, when the seat ring, retainer ring, and sealing ring are assembled, cooperates with an outwardly facing annular lip 160 formed integral with the retainer ring 154 to define an outer restriction to the annular groove 156. Annular substantially coplanar sealing surfaces 162 and 164 are disposed for intimate sealing contact with the working surfaces 50-52 of the gate 22 to form a fluid-tight metal to metal seal between the seat assembly and the gate at high lading pressures. The spacing between the lips 158 and 160 is sufficient to allow a portion of the curved sealing surface 108 of the sealing ring 104 to extend beyond the plane of the sealing surfaces 162 and 164 and into sealing engagement with the working surfaces 50-52 of the gate 22. Seat assemblies such as those illustrated in FIGURE 8 are interchangeable with the seat assemblies of FIGURES 1-6.

Figure 9:
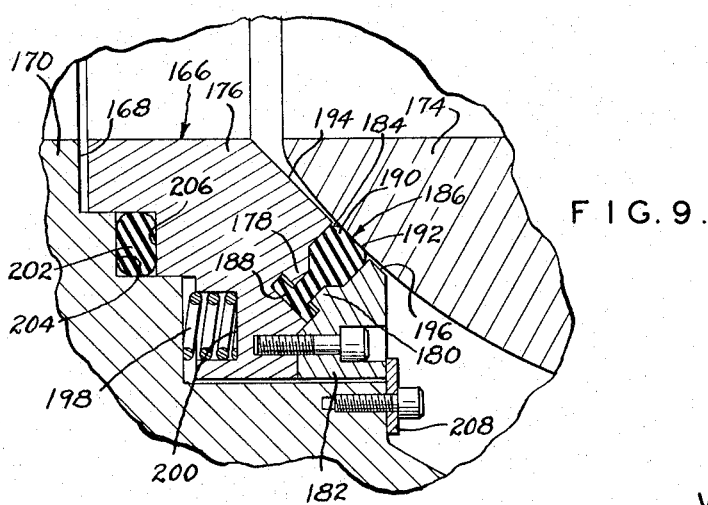
FIGURES 7–9 are partial sectional views illustrating modified embodiments of the invention.

As illustrated in FIGURE 9, seat assemblies are provided for a ball trunnioned valve incorporating sealing rings having a similar cross sectional shape and dimension as the cross sectional shape and dimension of the ring 104 illustrated in FIGURES 1-8. Seat assemblies 166 are fitted within opposing seat recesses 168 formed in the valve body 170 and are disposed to sealingly engage the spherical working surface 172 of a spherical plug or ball 174. A seat ring 176 shaped to fit loosely within the seat recess 168 is formed with an outer flange 178 which cooperates with an interior annular flange 180 formed integral with a retainer ring 182 to define a restriction intermediate the length of a sealing ring retainer groove 184. A resilient sealing ring 186 is fitted within the groove 184 and is retained against displacement therefrom by the cooperating flanges 178 and 180 which engage the base portions 188 of the sealing ring 186. An annular sealing portion of the sealing ring 186 has an outer surface 192 thereof which extends beyond generally conical sealing surfaces 194 and 196, formed respectively on the seat ring 176 and the retainer ring 182, and into sealing engagement with the working surface 172 of the spherical plug 174. The sealing ring 186 is smaller in cross section than the cross sectional dimension of the groove 184 whereby, upon movement of the conical surfaces 194 and 196 of the seat assembly 166 into intimate sealing engagement with the working surface 172 of the plug 174 the sealing ring 186 will be entirely displaced within the groove 184 by the surface 172 of the plug 174. Contact between sealing ring 186 of the seat assembly 166 and the working surface of the plug is maintained at all times by a series of compression springs 198 which are retained within a series of spring retainer recesses 200 formed in the seat ring 176. A fluid-tight seal is established at both low and high line pressures by an O-ring type resilient back face sealing ring 202 which is maintained under axial compression between the radial surfaces 204 and 206, respectively, of the valve body 170 and seat ring 176. The sealing ring 202 aids the springs 198 in maintaining sealing engagement between the seat assembly and the plug. A seat retainer member 206 is positioned within the valve chamber to prevent the seat assembly 166 or the retainer ring 182 from being forced into the valve chamber by the springs or the O-ring back face seal 202 in absence of the plug member such as will occur during assembly or disassembly of the valve. Since the plug member is trunnioned and will move neither upstream or downstream, only the upstream seat will be pressure actuated into engagement with the plug 174. Fluid within the valve body will be allowed to escape past the downstream seat into the downstream line.

In operation, the ball valve seat assemblies illustrated in FIGURE 9, function similar to the seat assemblies shown in FIGURES 1–8. At low line pressures the sealing ring will extend beyond the conical surfaces 194 and 196 of the seat assembly 166 and the curved surface 192 thereof will be in sealing engagement with the spherical surface 172 of the plug member 174. As line pressures increase to a high pressure level, with the plug member in its closed position, the upstream sealing ring 186 will be completely displaced within the groove 184 by the spherical working surface 172 of the plug. As the plug member is rotated from the closed to the open position, the base portion 188 of the sealing ring 186 will, in its cooperation with the flanges 178 and 180, lock the sealing ring 186 within the groove 184 to effectively prevent extrusion of the sealing ring into the path of the plug where it may be engaged and severed or otherwise damaged by the plug member. The resilient sealing ring 186, therefore, may be utilized at both low and high line pressures to form an effective seal.

It will be evident from the foregoing that I have provided a valve having elastomeric sealing members which will not be allowed to be deformed excessively by high line pressure. The amount of sealing member deformation which is allowed will not adversely affect the amount of torque required for normal movement of the valve member between open and closed positions. The valve of this invention is of relatively simple low cost mechanical construction and its simple mode of operation uniquely adapts the valve to both low pressure and high pressure application. Utilizing the concept of this invention effectively prevents shearing of or damage to the elastomeric sealing member by the valve member as it moves from one position to another position. The invention, therefore, is one well adapted to attain all of the objects hereinabove set forth, together with other advantages which are obvious and inherent from the description of the apparatus itself.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A sealing assembly for a valve having a movable valve member, said sealing assembly comprising an annular seat member having an annular interior flange thereon and having an annular planar sealing surface, a retiner member having an external annular flange thereon and having an annular planar sealing surface positioned coplanar relative to the planar sealing surface of said seat member, said retainer member being fitted concentrically within said seat member and defining with the seat member an annular groove having an annular restriction intermediate its ends and an enlarged portion at each end thereof, annular sealing member having a base portion and a sealing portion connected by an integral web portion, said base portion being retained within the inner end of the groove by said annular flanges, said sealing portion having an annular sealing surface extending beyond the coplanar sealing surfaces for sealing engagement with the valve member, said web portion substantially filling said restricted portion of the groove, and the base portion and sealing portion of said sealing member being of smaller cross sectional dimension than the cross sectional dimension of the inner and outer enlarged portions respectively of said groove.

2. A sealing assembly for a valve as set forth in claim 1, said seat member and said retainer member having annular lips cooperating to define an exterior restriction for said groove.

3. A valve comprising a body having a valve chamber formed therein, flow passages in said valve body in communication with the valve chamber, a valve member positioned within said valve chamber and movable between open and closed positions relative to said flow passages, means for imparting movement to the valve member, at least one annular seat member disposed within said valve chamber and having an annular planar sealing surface thereon, said seat member having an internal flange and an internal lip, an annular retainer member being positioned about a portion of said seat member and having an external flange and external lip cooperating with said internal flange and internal lip to define with the seat member an annular groove having a first restricted portion intermediate its inner and outer ends and a second restricted portion at its outer end, an annular sealing ring disposed within said annular groove, said sealing ring having a sealing portion, a base portion and an integral web portion, said sealing portion normally extending beyond said sealing surface and being in sealing engagement with the valve member, the base portion retained within the inner end of the groove by said first restricted portion and said sealing portion being supported against movement toward said gate by said second restricted portion of said groove.

4. A valve comprising a valve body formed with a valve chamber therein, flow passages formed in the valve body and communicating with the valve chamber, a valve member positioned within the valve chamber and being movable between open and closed positions relative to the flow passages, means for imparting movement to the valve member, a pair of annular seat rings positioned within the valve chamber, one on either side of the valve member and having an annular flange and an annular lip extending radially inwardly therefrom, a pair of retainer rings fitted one within each of the seat rings, each of the retainer rings having an annular flange and an annular lip extending radially outwardly therefrom and defining with the respective seat ring, a groove having a first restriction intermediate its length and a second restriction at its outer extremity, an annular sealing ring formed of elastomeric material being disposed within the groove, said sealing ring having a base portion and a sealing portion connected by an integral web portion, said sealing portion being retained against movement toward the gate by the retainer ring lip and seat ring lip and normally having a surface thereof extending outwardly of said groove and being in sealing engagement with said valve member, said sealing ring being retained within the inner extremity of the groove by the seat ring and retainer ring flanges, the integral web portion substantially filling said first restricted portion.

5. A valve comprising a valve body formed with a valve chamber therein, flow passages formed in the valve body and communicating with the valve chamber, a valve member positioned within the valve chamber and being movable between open and closed positions relative to the flow passages, means for imparting movement to the valve member, a pair of annular seat rings positioned within the valve chamber one on either side of the valve member and having an annular flange and an annular lip extending radially inwardly therefrom, a pair of retainer rings fitted one within each of the seat rings, each of the retainer rings having an annular flange and an annular lip extending radially outwardly therefrom and defining, with the respective seat ring a groove having a first restriction intermediate its length and a second restriction at its outer extremity, an annular sealing ring formed of elastomeric material being disposed within the groove, said sealing ring having a base portion and a sealing portion connected by an integral web portion, said sealing portion being retained against movement toward the gate by the retainer ring lip and seat ring lip and normally having a surface thereof extending outwardly of said groove and being in sealing engagement with said valve member, said sealing ring being retained within the inner extremity of the groove by the seat ring and retainer ring flanges, the integral web portion substantially filling said first restricted portion, said base portion being of less cross sectional dimension than the cross sectional dimension of the inner extremity of the groove.

6. A valve comprising a valve body formed with a valve chamber therein, flow passages formed in the valve body and communicating with the valve chamber, a valve member positioned within the valve chamber and being movable between open and closed positions relative to the flow passages, means for imparting movement to the valve member, a pair of annular seat rings positioned within the valve chamber, one on either side of the valve chamber and having an annular flange and an annular lip extending radially inwardly therefrom, a pair of retainer rings fitted one within each of the seat rings, each of the retainer rings having an annular flange and an annular lip extending radially outwardly therefrom and defining, with the respective seat ring a groove having a first restriction intermediate its length and a second restriction at its outer extremity, an annular sealing ring formed of elastomeric material being disposed within the groove, said sealing ring having a base portion and a sealing portion connected by an integral web portion, said sealing portion being retained against movement toward the gate by the retainer ring lip and seat ring lip and normally having a surface thereof extending outwardly of said groove and being in sealing engagement with said valve member, said sealing ring being retained within the inner extremity of the groove by the seat ring and retainer ring flanges, the integral web portion substantially filling the first restricted portion, said base portion being of less cross sectional dimension than the cross sectional dimension of the inner extremity of the groove, said sealing portion being of less cross sectional dimension than the cross sectional dimension of the outer extremity of the groove.

References Cited by the Examiner

UNITED STATES PATENTS

| | | | |
|---|---|---|---|
| 2,401,377 | 6/1946 | Smith | 251—327 |
| 2,950,897 | 8/1960 | Bryant | 251—328 X |
| 2,959,392 | 11/1960 | Platen et al. | 251—332 |
| 3,076,631 | 2/1963 | Grove | 251—328 X |
| 3,109,623 | 11/1963 | Bryant | 251—328 X |
| 3,121,553 | 2/1964 | Grove | 251—328 X |
| 3,131,906 | 5/1964 | King | 251—332 X |

M. CARY NELSON, *Primary Examiner.*

ARNOLD ROSENTHAL, *Examiner.*